US011247149B2

(12) United States Patent
Shewchuk et al.

(10) Patent No.: US 11,247,149 B2
(45) Date of Patent: Feb. 15, 2022

(54) SYSTEMS AND METHODS FOR SECURING A SEALING MEMBER ON A FILTER ASSEMBLY

(71) Applicant: CUMMINS FILTRATION IP, INC., Columbus, IN (US)

(72) Inventors: Luke Shewchuk, Inver Grove Heights, MN (US); Michael Lynn Hill, Cottage Grove, WI (US); Mark Holzmann, Stoughton, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 13 days.

(21) Appl. No.: 16/965,330

(22) PCT Filed: Jan. 28, 2019

(86) PCT No.: PCT/US2019/015362
§ 371 (c)(1),
(2) Date: Jul. 28, 2020

(87) PCT Pub. No.: WO2019/152305
PCT Pub. Date: Aug. 8, 2019

(65) Prior Publication Data
US 2021/0113942 A1     Apr. 22, 2021

Related U.S. Application Data

(60) Provisional application No. 62/624,193, filed on Jan. 31, 2018.

(51) Int. Cl.
*B01D 27/08*     (2006.01)
*B01D 36/00*     (2006.01)
(Continued)

(52) U.S. Cl.
CPC .......... *B01D 27/08* (2013.01); *B01D 36/005* (2013.01); *F01M 11/03* (2013.01); *F02M 37/28* (2019.01);
(Continued)

(58) Field of Classification Search
CPC .. B01D 27/08; B01D 36/005; B01D 2201/12; B01D 2201/302; B01D 2201/342;
(Continued)

(56) References Cited

U.S. PATENT DOCUMENTS 4,473,471 A     9/1984     Robichaud et al.
5,484,466 A     1/1996     Brown et al.
(Continued)

FOREIGN PATENT DOCUMENTS

CN     1269733 A     10/2000
CN     101501280     8/2009
(Continued)

OTHER PUBLICATIONS

International Search Report and Written Opinion issued for PCT/US2019/015362 dated Mar. 22, 2019, 13 pages.
(Continued)

*Primary Examiner* — Waqaas Ali
(74) *Attorney, Agent, or Firm* — Foley & Lardner LLP

(57) ABSTRACT

A filter assembly comprises a filter housing defining an internal volume, a filter element positioned within the internal volume, and a gasket retainer. An outer edge of the gasket retainer is coupled to a top end of the filter housing, and an inner rim thereof forms a gasket retainer ledge. The filter assembly further comprises a retainer loop comprising a retainer loop main body. A plurality of retainer arms extend axially from the retainer loop main body towards the gasket retainer. Each of the plurality of retainer arms comprise a retainer arm ledge extending radially towards the retainer
(Continued)

loop main body and snap-fit to the gasket retainer ledge. A retainer loop sidewall extends from the main body away from the gasket retainer. An outer surface of the retainer loop sidewall defines a curvature. A sealing member is removably positioned around the outer surface of the retainer loop sidewall.

20 Claims, 7 Drawing Sheets

(51) Int. Cl.
*F02M 37/28* (2019.01)
*F01M 11/03* (2006.01)
*F16N 39/06* (2006.01)

(52) U.S. Cl.
CPC .......... *F16N 39/06* (2013.01); *B01D 2201/12* (2013.01); *B01D 2201/302* (2013.01); *B01D 2201/342* (2013.01); *B01D 2201/4084* (2013.01); *F16N 2039/065* (2013.01)

(58) Field of Classification Search
CPC .......... B01D 2201/4084; B01D 36/006; B01D 2201/34; F02M 37/28; F02M 37/42; F01M 11/03; F16N 39/06; F16N 2039/065
See application file for complete search history.

(56) References Cited

U.S. PATENT DOCUMENTS

| | | | |
|---|---|---|---|
| 5,893,564 | A | 4/1999 | Yang |
| 6,019,229 | A * | 2/2000 | Rao ................. B01D 27/08 210/443 |
| 7,531,090 | B1 | 5/2009 | Stamey et al. |
| 8,083,074 | B2 | 12/2011 | South et al. |
| 2003/0196947 | A1 | 10/2003 | Gundrum et al. |
| 2004/0050766 | A1 | 3/2004 | Jiang |
| 2009/0300900 | A1 | 12/2009 | Kametaka et al. |
| 2012/0152199 | A1 * | 6/2012 | Thienel ................. B01D 29/96 123/195 C |
| 2016/0144297 | A1 | 5/2016 | Jokschas et al. |
| 2016/0193557 | A1 | 7/2016 | Neef et al. |

FOREIGN PATENT DOCUMENTS

| | | |
|---|---|---|
| CN | 102256706 | 11/2011 |
| CN | 102406486 | 4/2012 |
| CN | 102438717 A | 5/2012 |
| CN | 105051362 A | 11/2015 |
| CN | 105813706 | 7/2016 |
| DE | 102011009925 | 8/2012 |
| WO | WO-2017/036855 | 3/2017 |

OTHER PUBLICATIONS

First Office Action issued for Chinese Patent Application No. CN 2019800170910 dated Jun. 30, 2021, 8 pages.

* cited by examiner

SYSTEMS AND METHODS FOR SECURING A SEALING MEMBER ON A FILTER ASSEMBLY

CROSS REFERENCE TO RELATED APPLICATIONS

The present application is a National Stage of PCT Application No. PCT/US2019/015362, filed Jan. 28, 2019, which claims priority and benefit of U.S. Provisional Patent Application No. 62/624,193, filed Jan. 31, 2018 and entitled "Systems and Methods for Securing a Sealing Member on a Filter Assembly." The contents of these applications are incorporated herein by reference in their entirety.

TECHNICAL FIELD

The present disclosure relates generally to filters for use with internal combustion engine systems.

BACKGROUND

Internal combustion engines generally use various fluids during operation. For example, fuel (e.g., diesel, gasoline, natural gas, etc.) is used to run the engine. Air may be mixed with the fuel to produce an air-fuel mixture, which is then used by the engine to run under stoichiometric or lean conditions. Furthermore, one or more lubricants may be provided to the engine to lubricate various parts of the engine (e.g., piston cylinder, crank shaft, bearings, gears, valves, cams, etc.). These fluids may become contaminated with particulate matter (e.g., carbon, dust, metal particles, etc.) which may damage the various parts of the engine if not removed from the fluid.

Some filter assemblies comprise a filter element positioned within a filter housing, such as a shell housing. Such filter assemblies are generally provided as self-contained assemblies structured to be mounted on a filter head or other mounting structure. A sealing member such as an O-ring may be positioned on the filter assembly and structured to form a fluid seal between the filter assembly and the filter head. In a number of conventional filter assemblies, the sealing member is generally positioned loosely around the filter assembly and can easily come off during installation or removal of the filter assembly from the filter head, which may cause leakage of fluid.

SUMMARY

Embodiments described herein relate generally to systems and methods for securing a sealing member on a filter assembly, and in particular, a retainer loop snap-fit on a gasket retainer of a filter assembly and structured to secure the sealing member on an outer curved surface thereof cooperatively with the gasket retainer.

In a set of embodiments, a retainer assembly for a filter assembly comprises a gasket retainer and a retainer loop. An outer edge of the gasket retainer is configured to be coupled to a filter housing top end of a filter housing, and an inner rim of the gasket retainer forms a gasket retainer ledge. The retainer loop comprises a retainer loop main body, a plurality of retainer arms extending axially from the retainer loop main body towards the gasket retainer, each of the plurality of retainer arms comprising a retainer arm ledge extending radially towards the retainer loop main body and snap-fit to the gasket retainer ledge, and a retainer loop sidewall extending from the retainer loop main body away from the gasket retainer. An outer surface of the retainer loop sidewall defines a curvature. A sealing member is removably positioned around the outer surface of the retainer loop sidewall.

In another set of embodiments, a filter assembly comprises a filter housing defining an internal volume. A filter element is positioned within the internal volume. The filter assembly also comprises a gasket retainer. An outer edge of the gasket retainer is coupled to a top end of the filter housing. An inner rim of the gasket retainer forms a gasket retainer ledge. The filter assembly further comprises a retainer loop. The retainer loop comprises a retainer loop main body. A plurality of retainer arms extend axially from the retainer loop main body towards the gasket retainer. Each of the plurality of retainer arms comprises a retainer arm ledge extending radially towards the retainer loop main body and snap-fit to the gasket retainer ledge. A retainer loop sidewall extends from the retainer loop main body away from the gasket retainer. An outer surface of the retainer loop sidewall defines a curvature. A sealing member is removably positioned around the outer surface of the retainer loop sidewall.

In still another set of embodiments, a method for securing a sealing member of a filter assembly comprises providing a gasket retainer, an inner ledge of the gasket retainer forming a gasket retainer ledge. An outer edge of the gasket retainer is coupled to a filter housing top end of a filter housing. A retainer loop is provided, the retainer loop comprising: a retainer loop main body, a plurality of retainer arms extending axially from the retainer loop main body towards the gasket retainer, each of the plurality of retainer arms comprising a retainer arm ledge extending radially towards the retainer loop main body and snap-fit to the gasket retainer ledge, and retainer loop sidewall extending from the retainer loop main body away from the gasket retainer. An outer surface of the retainer loop sidewall defines a curvature. The retainer loop is positioned on the gasket retainer such that the plurality of retainer arms snap-fit onto the gasket retainer ledge. The sealing member is positioned around the outer surface of the retainer loop sidewall.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
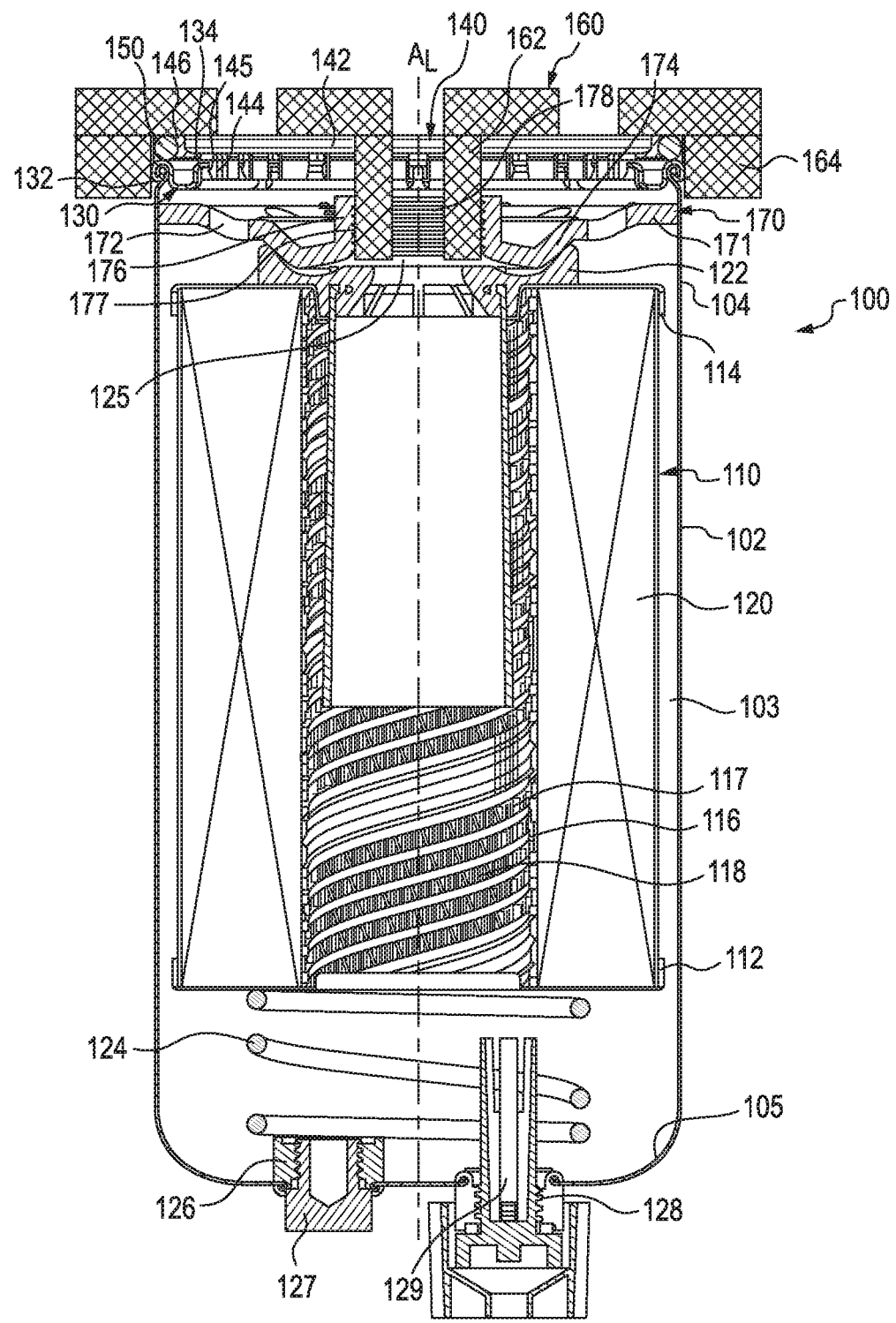
FIG. 1 is a side cross-section of a filter assembly, according to an embodiment.
Figure 2A:
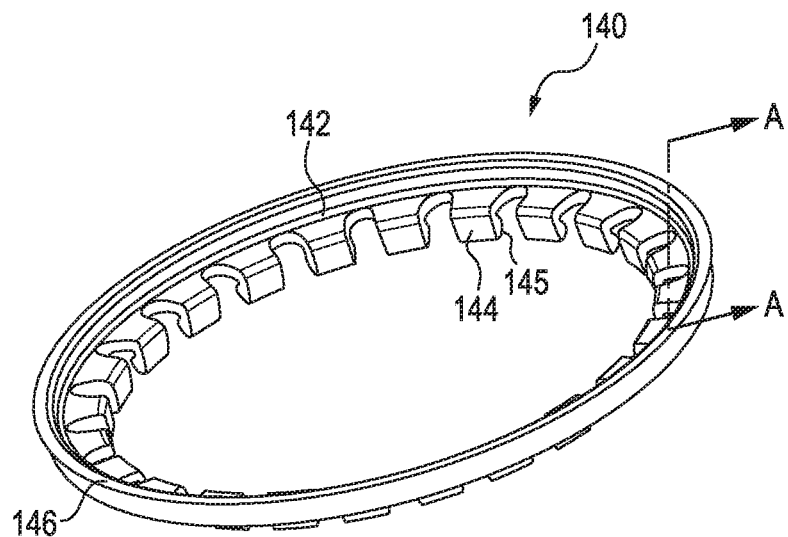
FIG. 2A is a top perspective view of a retainer loop included in the filter assembly of FIG. 1.
Figure 2B:
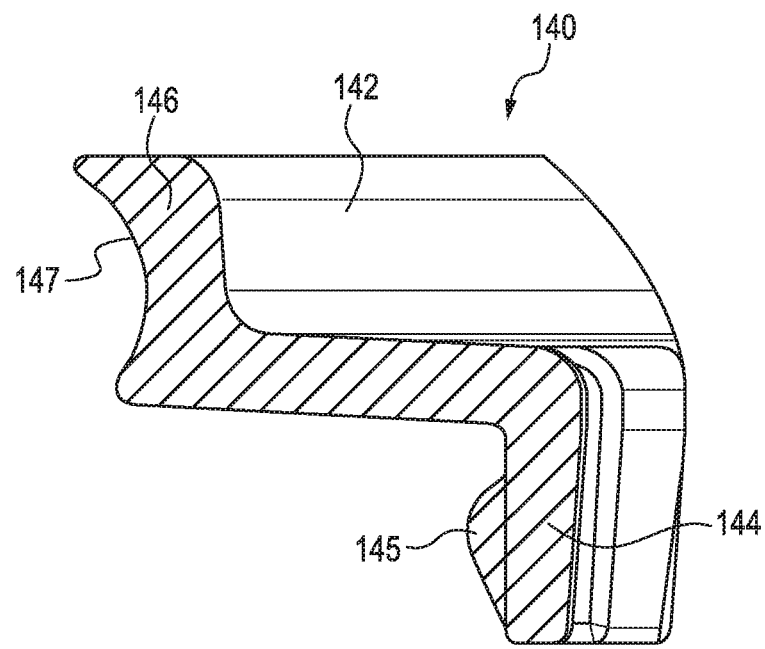
FIG. 2B is a side cross-section view of the retainer loop of FIG. 2A, taken along line A-A shown in FIG. 2A.
Figure 3A:
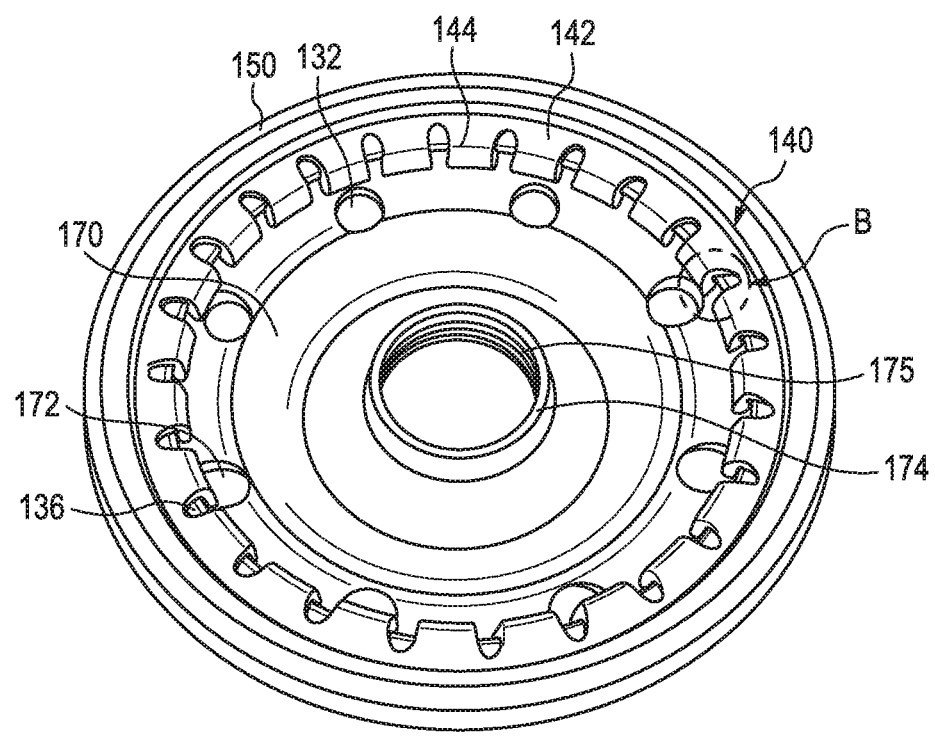
FIG. 3A is a top view of a nut plate included in the filter assembly of FIG. 1 showing the retainer loop of FIG. 2A-B mounted on a gasket retainer.
Figure 3B:
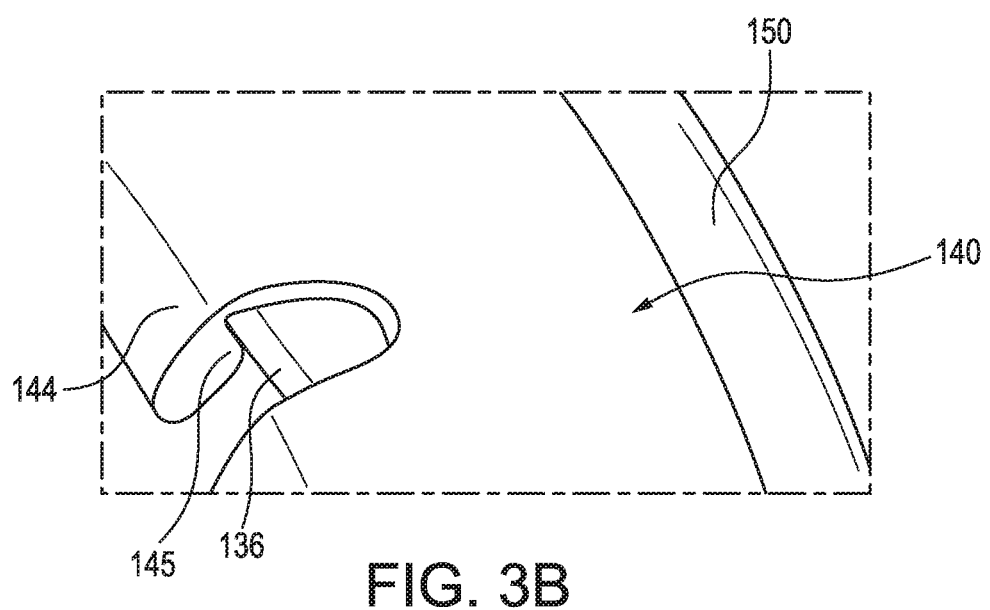
FIG. 3B is an enlarged view of a portion of the retainer loop shown by the arrow B in FIG. 3A.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for securing a sealing member on a filter assembly, and in particular, a retainer loop snap-fit on a gasket retainer of a filter assembly and structured to secure the sealing member on an outer curved surface thereof cooperatively with the gasket retainer.

Some filter assemblies comprise a filter element positioned within a filter housing, such as a shell housing. Such filter assemblies may be generally provided as self-contained assemblies structured to be mounted on a filter head or other mounting structure. A sealing member such as an O-ring may be generally positioned on the filter assembly and structured to form a fluid seal between the filter assembly and the filter head. In a number of conventional filter assemblies, the sealing member is generally positioned loosely around the filter assembly and can easily come off during installation or removal of the filter assembly from the filter head, which may cause leakage of fluid.

Embodiments described herein that provide for securing a sealing member of a filter assembly may provide benefits including, for example: (1) positioning the sealing member via a retainer loop comprising a plurality of retainer arms which snap-fit on a gasket retainer, thereby increasing a contact surface area of the retainer arms on the gasket retainer and leading to an increase in a retention force on the sealing member; (2) securing the sealing member cooperatively via the retainer loop and a gasket retainer so as to prevent the sealing member form being dislodged and/or lost which may cause sealing issues (e.g., fluid leakage); (3) centrally locating the sealing member around the retainer loop; (4) providing easier assembly by allowing positioning of the sealing member on the retainer loop after the retainer loop has been coupled to the gasket retainer; and (6) providing both radial and axial sealing of the filter assembly when the filter assembly is coupled to a filter head.

FIG. 1 is a side cross-section of a filter assembly 100 according to an embodiment. The filter assembly 100 may be used to filter a liquid (e.g., lubricant, fuel, etc.), a gas (e.g., air), air/fuel mixture, or another fluid provided to an engine. The filter assembly 100 comprises a filter housing 102, a filter element 110, a gasket retainer 130, a retainer loop 140, and a sealing member 150 positioned around the retainer loop 140 as described in detail herein.

The filter housing 102 defines a filter housing internal volume 103 within which the filter element 110 is positioned. The filter housing 102 may be formed from a strong and rigid material, for example plastics (e.g., polypropylene, high density polyethylene, polyvinyl chloride, etc.), metals (e.g., aluminum, stainless steel, etc.), polymers (e.g., reinforced rubber, silicone) or any other suitable material. In particular embodiments, the filter housing 102 may comprise a cylindrical housing having generally a circular cross-section. In other embodiments, the filter housing 102 may have any suitable cross-sectional shape, for example racetrack, oval, rectangular, polygonal, etc. In particular embodiments, the filter housing 102 may comprise a shell housing.

The filter housing 102 includes a filter housing base 105 which may have a bowl shape, for example to collect any water included in the fluid (e.g., air, fuel, air/fuel mixture or lubricant) being filtered through the filter assembly 100. A drain port 126 may be provided in the filter housing base 105. A drain plug 127 may be coupled to the drain port 126. The drain plug 127 may be selectively removable from the drain port 126 so as to allow accumulated water to be drained from the filter housing 102.

In some embodiments, a sensor port 128 is also formed in the filter housing base 105 of the filter housing 102. A water-in-filter (WIF) sensor 129 may be positioned in the sensor port 128 and connected to a controller (e.g., WIF monitor an engine control unit) via an electrical connector. The WIF sensor 129 may be configured to sense a level of water accumulated in the filter housing base 105. In some embodiments, the WIF sensor 129 may communicate a water level signal to a controller. The controller may inform a user that a water level in the filter housing 102 is above a predetermined threshold, so that the user may remove the drain plug 127 and drain the water from the filter assembly 100 via the drain port 126. In other embodiments, a valve may be positioned in the drain port 126. The WIF sensor 129 may be configured to communicate a valve signal to the valve causing the valve to move into an open position in response to a level of water accumulated in the filter housing base 105 exceeding a predetermined threshold.

The filter element 110 is positioned along a longitudinal axis $A_L$ of the filter assembly 100 within the filter housing internal volume 103. The filter element 110 comprises a filter media 120. The filter media 120 includes a porous material having a predetermined pore size and is configured to filter particulate matter from the fluid flowing therethrough. The filter media 120 or any other filter media described herein may include pleated media, tetrahedral media, fluted filter media, corrugated filter media or variations thereof.

In some embodiments, the filter media 120 may be caged. For example, the filter element 110 may also comprise a porous rigid structure (e.g., a wire mesh) positioned around the filter media 120, which is structured to prevent damage to the filter media 120 during insertion of the filter element 110 into the filter housing internal volume 103.

The filter media 120 may be positioned around a center tube 116. In particular embodiments, the center tube 116 may be included in the filter element 110, for example, the filter media 120 may be wound around or otherwise coupled to the center tube 116. The center tube 116 defines a center tube channel 118 in fluid communication with a fluid outlet 125 through which filtered fluid (e.g., filtered air, fuel or air/fuel mixture) is delivered out of the filter housing 102. The center tube 116 may include a plurality of openings 117 structured to allow the filtered fluid to flow through the filter media 120 into the center tube channel 118, and therefrom to the fluid outlet 125.

A first end cap 112 is coupled to a filter media first end of the filter media 120 proximal to the filter housing base 105. The first end cap 112 may define a first end cap opening structured to receive a center tube first end of the center tube 116. A second end cap 114 is coupled to a filter media second end of the filter media 120 opposite the filter media first end proximate a filter housing top end 104. The second end cap 114 may define a second end cap opening structured to receive a center tube second end of the center tube 116 opposite the center tube first end. The first end cap 112 and the second end cap 114 may be formed from any suitable material, for example plastics, metals, rubber, reinforced rubber, polymers, etc.

The first end cap 112 and the second end cap 114 may have a cross-section generally corresponding to the cross-section of the filter housing 102. In other embodiments, the cross-section of the first end cap 112 and the second end cap 114 may be smaller than the cross-section of the filter housing 102. The second end cap 114 may protect the filter media first end of the filter media 120 from damage as the filter element 110 is inserted into the filter housing internal volume 103 and/or maintain a shape (e.g., a cylindrical shape) of the filter media 120, so as to facilitate insertion of the filter element 110 into the filter housing internal volume 103. In particular embodiments, the first end cap 112 and the second end cap 114 may be fixedly coupled to the filter media first end and the filter media second end, respectively via an adhesive or thermally bonded thereto.

A nut plate 170 is positioned in the filter housing internal volume 103 proximate the filter housing top end 104. The nut plate 170 comprises a generally circular member positioned radially around the longitudinal axis $A_L$ and having a diameter or cross-section corresponding to diameter or cross-section of the filter housing 102. The nut plate 170 comprises a nut plate outer portion 171 positioned proximate to a sidewall of the filter housing 102. In some embodiments, threads may be defined on an edge of the nut plate outer portion 171 of the nut plate 170. The threads may be configured to mate with mating threads defined on an inner surface of the sidewall of the filter housing 102 proximate to the filter housing top end 104. In other embodiments, the edge of the nut plate outer portion 171 may be welded to the inner surface of the filter housing 102. In still other embodiments, the nut plate 170 may be coupled to (e.g., welded to or monolithically formed with) the gasket retainer 130 included in the filter assembly 100 which is coupled to the filter housing top end 104 of the filter housing 102, and described in further detail herein.

A plurality of openings 172 are defined in the nut plate outer portion 171. The plurality of openings 172 may be configured to allow the fluid (e.g., air, fuel or air/fuel mixture) to be communicated therethrough into the filter housing internal volume 103 around the filter media 120. The fluid flows through the filter media 120 to the center tube channel 118 and is thereby filtered. The nut plate 170 also comprises a nut plate inner portion 174. The nut plate inner portion 174 is positioned on the filter element 110 and may be configured to secure the filter element 110 in the filter housing 102.

Expanding further, the filter element 110 may be positioned on a biasing member 124 (e.g., a helical spring, a coil spring, a Belleville spring, a leaf spring or any other suitable biasing member) positioned on the filter housing base 105. Furthermore, an interfacial sealing member 122 may be positioned on or coupled to the second end cap 114. The interfacial sealing member 122 may be formed from a soft polymeric material, for example, rubber or polymers. In particular embodiments, the interfacial sealing member 122 may be monolithically formed with the second end cap 114 (e.g., molded therewith).

As shown in FIG. 1, the nut plate inner portion 174 is structured to contact the interfacial sealing member 122 as the nut plate 170 is inserted into the filter housing internal volume 103. The biasing member 124 exerts a biasing force on the filter element 110 and pushes the filter element 110 and thereby, the interfacial sealing member 122 towards the nut plate 170. In this manner, the interfacial sealing member 122 is pressed against the nut plate inner portion 174 so as to form a fluid tight seal therewith and prevent unfiltered fluid from entering the center tube channel 118.

A nut plate conduit 176 extends axially from an inner rim of the nut plate inner portion 174 away from the filter element 110. The nut plate conduit 176 is configured to receive an inlet conduit 162 of a filter head 160 to which the filter assembly 100 may be removably coupled, and configured to allow filtered fluid to be communicated from the fluid outlet 125 out of the filter assembly 100 into the inlet conduit 162. The filter head 160 may include, for example, a receiving structure of a system (e.g., an engine or a vehicle) structured to allow mounting of the filter assembly 100 thereto. The filter head 160 is configured to communicate unfiltered fluid (e.g., air, fuel or air/fuel mixture) to the filter assembly 100 and receive filtered fluid therefrom (e.g., via the inlet conduit 162). A plurality of threads 177 may be defined on an inner surface of the nut plate conduit 176 and configured to mate with mating threads defined on an outer surface of the inlet conduit 162 of the filter head 160. This may allow coupling of the filter assembly 100 to the filter head 160.

The gasket retainer 130 and the retainer loop 140 are configured to cooperatively secure a sealing member 150 to the filter assembly 100. The sealing member 150 may comprise, for example, an O-ring, a gasket, or any other sealing member. The sealing member 150 may be formed from any suitable flexible material (e.g., rubber, polymers, etc.). In particular embodiments, the sealing member 150 comprises an O-ring having a circular cross-section.

As shown in FIG. 1, the sealing member 150 is positioned between a filter head inner-sidewall 164 of the filter head 160, the retainer loop 140 and the gasket retainer 130, and is configured to provide an axial and radial fluid seal between the retainer loop 140, the gasket retainer 130 and the filter head inner sidewall 164 so as to prevent leakage of the fluid (e.g., air, fuel or air/fuel mixture) being inserted into the filter assembly 100 from the filter head 160 and/or flow of an external fluid (e.g., air) from outside the filter assembly 100, into the filter assembly 100. In particular embodiments, an additional axial fluid sealing member may be positioned between the filter head 160 and a top surface of the sealing member 150 distal from the gasket retainer 130.

Figure 4:
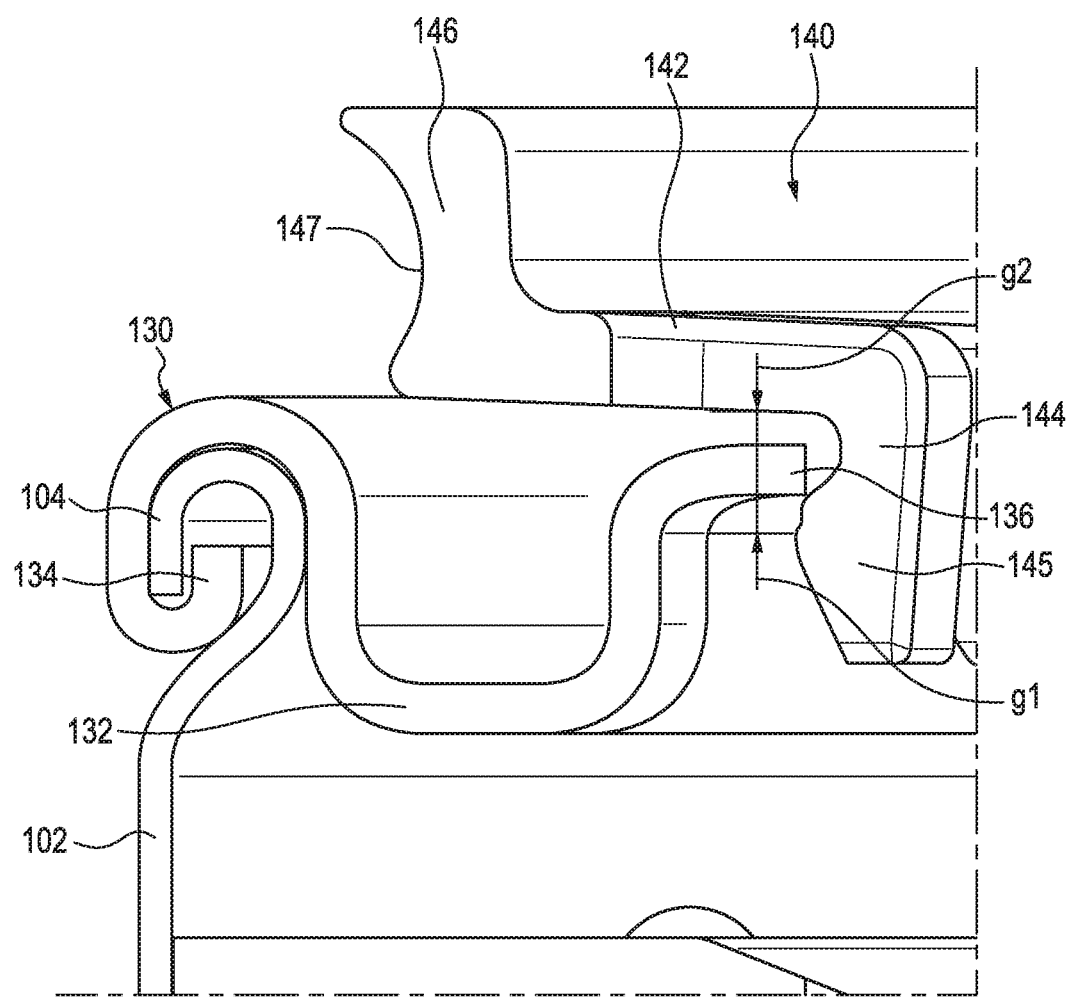
FIG. 4 is a side cross-section of a top portion of the filter assembly of FIG. 1 showing the retainer loop and the gasket retainer in a first configuration in which a sealing member is removed from an outer surface of a retainer loop sidewall of the retainer loop.
Figure 5:
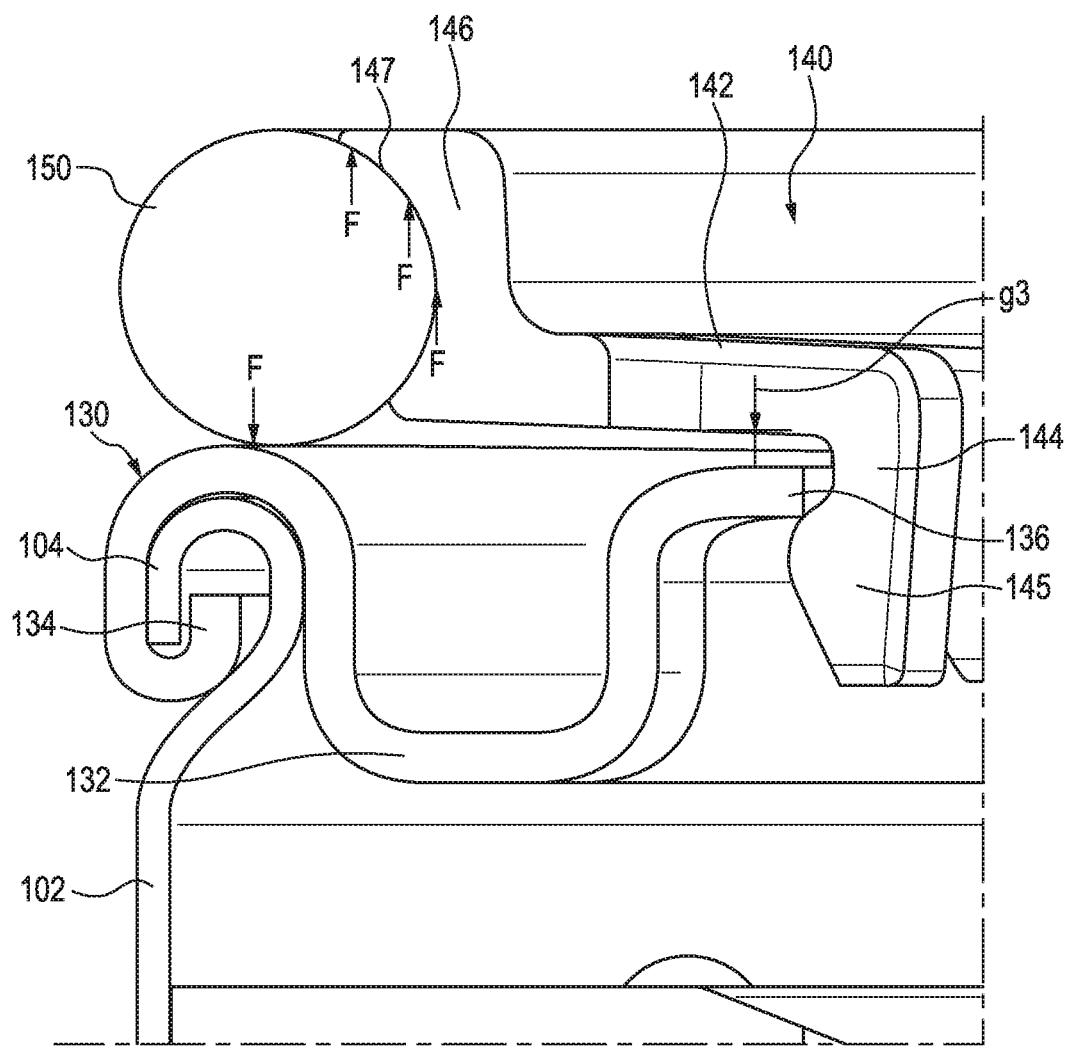
FIG. 5 is a side cross-section of the top portion of the filter assembly shown in FIG. 4 showing the retainer loop and the gasket retainer in a second configuration in which the sealing member is positioned around the outer surface of the retainer loop sidewall of the retainer loop.

Referring also now to FIGS. 2A-5, the gasket retainer 130 comprises a generally ring shaped gasket retainer main body 132. In other embodiments, the gasket retainer main body 132 may have any other suitable cross-section, for example, oval, racetrack, square, rectangular, polygonal, asymmetrical, etc. An outer edge 134 of the gasket retainer 130 extends radially outwards from the gasket retainer main body 132 and is coupled to the filter housing top end 104 of the filter housing 102. For example, as shown in FIGS. 1, 4 and 5, the outer edge 134 may be rolled with the filter housing top end 104 or otherwise crimped to the filter housing top end 104 so as to couple the outer edge 134 of the gasket retainer 130 to the filter housing top end 104. In other embodiments, the outer edge 134 may be welded, bonded (e.g., fusion bonded, heat bonded, etc.), bolted, screwed, snap-fit, or otherwise coupled to the filter housing top end 104 using any other suitable coupling mechanism. In particular embodiments, the gasket retainer 130 may be coupled to the nut plate 170 or monolithically formed therewith. For example, an outer nut plate sidewall may extend axially from an outer rim of the nut plate outer portion 171 away from the filter element 110, and be shaped to form the gasket retainer 130. An inner rim of the gasket retainer 130 extends inwards from the gasket retainer main body 132 and is structured to form a gasket retainer ledge 136.

The retainer loop 140 is configured to snap-fit to the gasket retainer ledge 136. The retainer loop 140 may be formed from any suitable material, for example, plastics, metals, rubber, polymers, etc. As shown in FIGS. 2A-5, the retainer loop 140 comprises a ring shaped retainer loop main body 142 (best shown in FIGS. 2A and 3A). In other embodiments, the retainer loop main body 142 may have any other suitable cross-section corresponding to a cross-section of the gasket retainer main body 132, for example, oval, square, rectangular, polygonal, asymmetrical, etc. A plurality of retainer arms 144 extend axially from the retainer loop main body 142 towards the gasket retainer 130, and may generally be L-shaped. Each of the plurality of retainer arms 144 comprises a retainer arm ledge 145 extending radially towards the retainer loop main body 142 from a bottom end of the plurality of retainer arms 144 proximate to the gasket retainer ledge 136. Each of the retainer arm ledges 145 are structured to snap-fit to the gasket retainer ledge 136, for example, when the sealing member 150 is positioned around the retainer loop 140, as described in further detail herein.

A retainer loop sidewall 146 extends axially from an outer rim of the retainer loop main body 142 away from the gasket retainer 130. An outer surface 147 of the retainer loop sidewall 146 defines a curvature. The sealing member 150 is removably positioned around the outer surface 147 of the retainer loop sidewall 146. The curvature of the outer surface 147 may correspond to a curvature of the sealing member 150.

FIG. 4 is a side cross-section of a top portion of the filter assembly 100 of FIG. 1 showing the retainer loop 140 and the gasket retainer 130 in a first configuration in which the sealing member 150 is removed from the outer surface 147. The plurality of retainer arms 144 may have a length such that removing of the sealing member 150 from the filter assembly 100 may cause a first gap g1 to exist between each of the retainer arm ledges 145 and a bottom surface of the gasket retainer ledge 136. Furthermore, a second gap g2 may also exist between the retainer loop main body 142 and a top surface of the gasket retainer ledge 136. This may allow the retainer loop 140 to be free to move axially and rotate relative to the gasket retainer 130. Free movement of the retainer loop 140 in the first configuration may indicate to a user that the sealing member 150 is missing from the filter assembly 100, thereby preventing the user from erroneously installing the filter assembly 100 on a filter head (e.g., the filter head 160) without the sealing member 150 positioned thereon.

FIG. 5 is a side cross-section of the top portion of the filter assembly 100 showing the retainer loop 140 and the gasket retainer 130 in a second configuration in which the sealing member 150 is positioned around the outer surface 147 of the retainer loop sidewall 146. As shown in FIG. 5, positioning of the sealing member 150 on the outer surface 147 of the retainer loop sidewall 146 causes a first portion of the sealing member 150 to be in contact with the gasket retainer 130. Furthermore, a second portion of the sealing member 150 contacts the outer surface 147 of the retainer loop sidewall 146. The sealing member 150 exerts a force on each of the gasket retainer 130 and the retainer loop 140 (i.e., the outer surface 147 of the retainer loop sidewall 146) in directions shown by the arrows F. For example, positioning of the sealing member 150 around the outer surface 147 may cause the sealing member 150 to be slightly compressed (e.g., up to 10% of a diameter of the sealing member 150), thereby causing the sealing member 150 to exert the force on the outer surface 147 of the retainer loop sidewall 146 and the gasket retainer 130.

The force causes the retainer loop 140 to move upwards relative to the gasket retainer 130. Each of the plurality of retainer arms 144 may be structured to have a predetermined length such that the upward movement causes the retainer arm ledges 145 to contact the bottom surface of the gasket retainer ledge 136 and no gap remains between the retainer arm ledges 145 and the gasket retainer ledge 136. In other words, the retainer arm ledges 145 engage the gasket retainer ledge 136 in the second configuration so as to snap-fit the retainer arms 144 to the gasket retainer ledge 136. Furthermore, a third gap g3 exists between the retainer loop main body 142 and the top surface of the gasket retainer ledge 136, which is larger than the second gap g2.

In this manner, the sealing member 150 is secured between the outer surface 147 of the retainer loop sidewall 146 of the retainer loop 140, and the gasket retainer 130, as well as centered around the longitudinal axis $A_L$ of the filter assembly 100. The retainer loop 140 may exert an equal and opposite force on the sealing member 150, for example, due to the retainer arm ledge 145 engaging the gasket retainer ledge 136 and preventing upward motion of the retainer loop 140 relative to the gasket retainer 130. Moreover, a number and/or spacing of the plurality of retainer arms 144 may be configured to provide a uniform force on the sealing member 150.

The force exerted by the sealing member 150 on the retainer loop 140 and engagement of the gasket retainer ledge 136 by the retainer arm ledge 145 causes the retainer loop 140 to be immovable relative to the gasket retainer 130 when the sealing member 150 is positioned between the retainer loop 140 and the gasket retainer 130. For example, friction between the outer surface 147 of the retainer loop sidewall 146 and the sealing member 150, the sealing member 150 and the gasket retainer 130, and the retainer arm ledge 145 and the gasket retainer ledge 136 may immobilize the retainer loop 140 relative to the gasket retainer 130.

Figure 6:
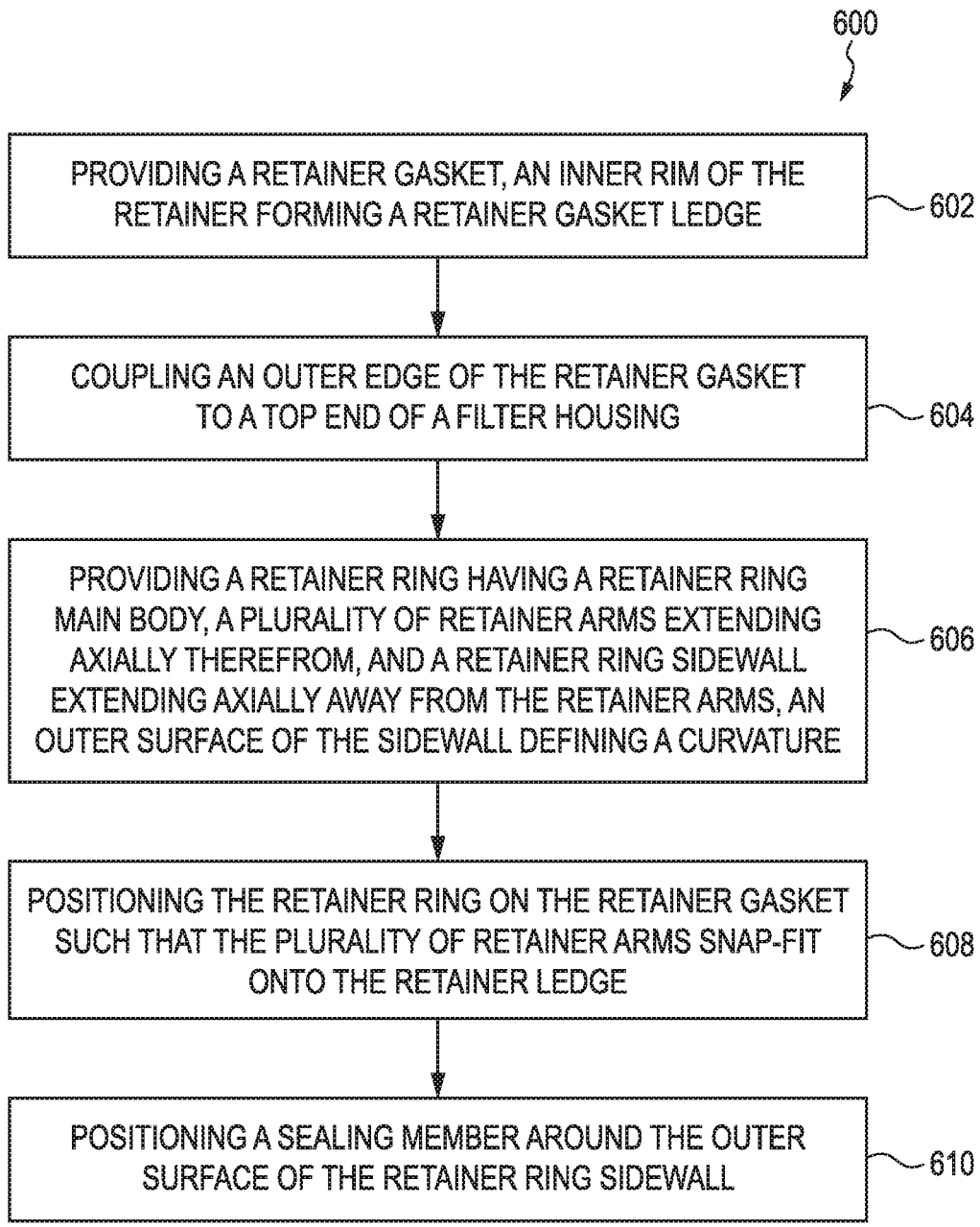
FIG. 6 is schematic flow diagram of a method for securing a sealing member on a filter assembly, according to an embodiment.

FIG. 6 is schematic flow diagram of a method 600 for securing a sealing member (e.g., the sealing member 150) on a filter assembly (e.g., the filter assembly 100), according to an embodiment. The method 600 comprises providing a gasket retainer, at 602. An inner rim of the gasket retainer forms a gasket retainer ledge. For example, the gasket retainer may comprise the gasket retainer 130 with an inner rim thereof forming the gasket retainer ledge 136.

At 604, an outer edge of the gasket retainer is coupled to a top end of a filter housing. For example, the outer edge 134 of the gasket retainer 130 is coupled to the filter housing top end 104 of the filter housing 102 (e.g., crimped, welded, bonded, bolted, screwed or otherwise coupled thereto using any suitable coupling mechanism). At 606, a retainer loop (e.g., the retainer loop 140) is provided. The retainer loop (e.g., the retainer loop 140) comprises a retainer loop main body (e.g., the retainer loop main body 142). A plurality of retainer arms (e.g., the plurality of retainer arms 144) extend axially from an inner rim of the retainer loop main body (e.g., the retainer loop main body 142). A retainer loop sidewall (e.g., the retainer loop sidewall 146) extends axially from an outer rim of the retainer loop main body away from plurality of retainer arms. An outer surface (e.g., the outer surface 147) of the retainer loop sidewall (e.g., the retainer loop sidewall 146) defines a curvature. The curvature may correspond to a curvature of an outer surface of a sealing member (e.g., the sealing member 150).

At 608, the retainer loop is positioned on the gasket retainer such that the plurality of retainer arms snap-fit onto the gasket retainer ledge. For example, the retainer loop 140 is positioned on the gasket retainer 130 such that each of the retainer arm ledges 145 of the plurality of retainer arms 144 engage and snap-fit to the gasket retainer ledge 136. Furthermore, the retainer loop may be free to move axially and rotate relative to the gasket retainer after operation 608, as previously described herein with respect to FIG. 4.

At 610, a sealing member is positioned around the outer surface of the retainer loop sidewall. For example, the sealing member 150 is positioned around the outer surface 147 of the retainer loop sidewall 146 such that the sealing member 150 is secured between the outer surface 147 of the retainer loop sidewall 146 and the gasket retainer 130, as previously described herein with respect to FIG. 5. Moreover, the retainer loop 140 may be immovable relative to the gasket retainer 130 after operation 610, as previously described herein.

Figure 7:
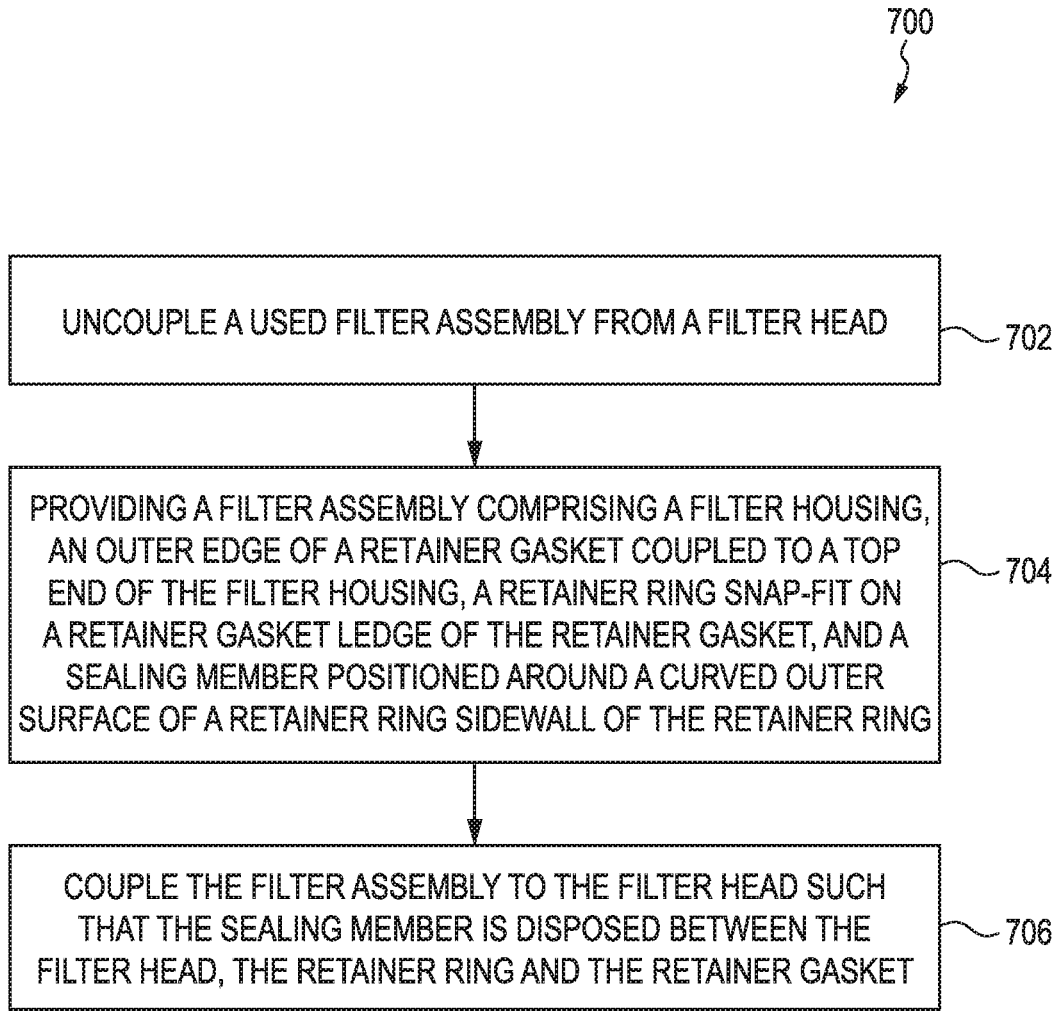
FIG. 7 is a schematic flow diagram of a method for replacing a used filter assembly mounted on a filter head with a filter assembly including a sealing member secured on the filter assembly via a gasket retainer and a retainer loop, according to another embodiment.

FIG. 7 is a schematic flow diagram of an example method 700 for replacing a used filter assembly mounted on a filter head (e.g., the filter head 160). The method 700 comprises uncoupling a used filter assembly from the filter head, at 702. For example, a conventional filter assembly which may have a sealing member positioned loosely therearound is removed from the filter head 160.

At 704, a filter assembly (e.g., the filter assembly 100) is provided. The filter assembly comprises a filter housing (e.g., the filter housing 102). An outer edge of a gasket retainer (e.g., the outer edge 134 of the gasket retainer 130) is coupled to a top end of the filter housing (e.g., the filter housing top end 104 of the filter housing 102, as previously described herein). A retainer loop (e.g., the retainer loop 140) is snap-fit on a gasket retainer ledge (e.g., the gasket retainer ledge 136) of the gasket retainer. For example, the plurality of retainer arms 144 of the retainer loop 140 are snap-fit on the gasket retainer ledge 136 of the gasket retainer 130, as previously described herein. Furthermore, a sealing member (e.g., the sealing member 150) is positioned around an outer surface (e.g., the outer surface 147) of a retainer loop sidewall (e.g., the retainer loop sidewall 146) of the retainer loop (e.g., the retainer loop 140). For example, the sealing member 150 is positioned around the outer surface 147 of the retainer loop sidewall 146 and secured between the retainer loop 140 and the gasket retainer 130 as previously described herein.

At 706, the filter assembly is mounted on the filter head. For example, the filter assembly 100 is mounted on the filter head 160 such that the sealing member 150 is disposed between the filter head 160, the gasket retainer 130 and the retainer loop 140, and fluidly seals the filter assembly 100 to the filter head 160.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A retainer assembly for a filter assembly, comprising:
   a gasket retainer, an outer edge of the gasket retainer configured to be coupled to a filter housing top end of a filter housing, and an inner rim of the gasket retainer forming a gasket retainer ledge;
a retainer loop, comprising;
a retainer loop main body,
a plurality of retainer arms extending axially from the retainer loop main body towards the gasket retainer, each of the plurality of retainer arms comprising a retainer arm ledge extending radially towards the retainer loop main body and snap-fit to the gasket retainer ledge, and
a retainer loop sidewall extending from the retainer loop main body away from the gasket retainer, an outer surface of the retainer loop sidewall defining a curvature; and
a sealing member removably positioned around the outer surface of the retainer loop sidewall.

2. The retainer assembly of claim 1, wherein the curvature of the outer surface corresponds to a curvature of the sealing member.

3. The retainer assembly of claim 1, wherein removing the sealing member from the retainer loop causes at least one of a first gap to exist between each of the retainer arm ledges and a bottom surface of the gasket retainer ledge, and a second gap to exist between the retainer loop main body and a top surface of the gasket retainer ledge such that the retainer loop is free to move axially, and rotate relative to the gasket retainer.

4. The retainer assembly of claim 3, wherein positioning the sealing member on the outer surface of the retainer loop sidewall causes a first portion of the sealing member to be in contact with the gasket retainer, and a second portion of the sealing member to be in contact with the outer surface of the retainer loop sidewall, such that the sealing member exerts a force on each of the gasket retainer and the retainer loop, the force causing the retainer arm ledge to contact the gasket retainer ledge such that the sealing member is secured between the gasket retainer and the retainer loop.

5. The retainer assembly of claim 4, wherein the retainer loop is immovable relative to the gasket retainer when the sealing member is positioned between the retainer loop and the gasket retainer.

6. The retainer assembly of claim 1, further comprising a nut plate comprising a circular member configured to be positioned radially along a longitudinal axis of the filter assembly.

7. The retainer assembly of claim 6, wherein the gasket retainer is coupled to an outer edge of the nut plate.

8. A filter assembly, comprising:
a filter housing defining an internal volume,
a filter element positioned within the internal volume;
a gasket retainer, an outer edge of the gasket retainer coupled to a filter housing top end of the filter housing, and an inner rim of the gasket retainer forming a gasket retainer ledge;
a retainer loop, comprising;
a retainer loop main body,
a plurality of retainer arms extending axially from the retainer loop main body towards the gasket retainer, each of the plurality of retainer arms comprising a retainer arm ledge extending radially towards the retainer loop main body and snap-fit to the gasket retainer ledge, and
a retainer loop sidewall extending from the retainer loop main body away from the gasket retainer, an outer surface of the retainer loop sidewall defining a curvature; and
a sealing member removably positioned around the outer surface of the retainer loop sidewall.

9. The filter assembly of claim 8, wherein the curvature of the outer surface corresponds to a curvature of the sealing member.

10. The filter assembly of claim 8, wherein removing the sealing member from the filter assembly causes at least one of a first gap to exist between each of the retainer arm ledges and a bottom surface of the gasket retainer ledge, and a second gap to exist between the retainer loop main body and a top surface of the gasket retainer ledge such that the retainer loop is free to move axially, and rotate relative to the gasket retainer.

11. The filter assembly of claim 10, wherein positioning the sealing member on the outer surface of the retainer loop sidewall causes a first portion of the sealing member to be in contact with the gasket retainer, and a second portion of the sealing member to be in contact with the outer surface of the retainer loop sidewall, such that the sealing member exerts a force on each of the gasket retainer and the retainer loop, the force causing the retainer arm ledge to contact the gasket retainer ledge such that the sealing member is secured between the gasket retainer and the retainer loop.

12. The filter assembly of claim 11, wherein the retainer loop is immovable relative to the gasket retainer when the sealing member is positioned between the retainer loop and the gasket retainer.

13. The filter assembly of claim 8, further comprising a nut plate positioned in the internal volume of the filter housing proximate to the filter housing top end, the nut plate comprising a circular member positioned radially along a longitudinal axis of the filter assembly and having a cross-section corresponding to a cross-section of the filter housing.

14. The filter assembly of claim 13, wherein the gasket retainer is coupled to an outer edge of the nut plate.

15. The filter assembly of claim 8, wherein the filter housing is configured to be coupled to a filter head, and wherein the sealing member is configured to be positioned between an inner side-wall of the filter head, the retainer loop, and the gasket retainer when the filter head is coupled to the filter housing.

16. The filter assembly of claim 8, wherein the outer edge of the gasket retainer is crimped to the filter housing top end.

17. A method for securing a sealing member of a filter assembly, comprising:
providing a gasket retainer, an inner ledge of the gasket retainer forming a gasket retainer ledge;
coupling an outer edge of the gasket retainer to a filter housing top end of a filter housing;
providing a retainer loop, the retainer loop comprising:
a retainer loop main body,
a plurality of retainer arms extending axially from the retainer loop main body towards the gasket retainer, each of the plurality of retainer arms comprising a retainer arm ledge extending radially towards the retainer loop main body and snap-fit to the gasket retainer ledge, and
a retainer loop sidewall extending from the retainer loop main body away from the gasket retainer, an outer surface of the retainer loop sidewall defining a curvature;
positioning the retainer loop on the gasket retainer such that the plurality of retainer arms snap-fit onto the gasket retainer ledge; and
positioning the sealing member around the outer surface of the retainer loop sidewall.

18. The method of claim 17, wherein before positioning of the sealing member around the outer surface of the retainer loop sidewall, at least one of a first gap exists between each of the retainer arm ledges and a bottom surface of the gasket retainer ledge, and a second gap exists between the retainer loop main body and a top surface of the gasket retainer ledge such that the retainer loop is free to move axially, and rotate relative to the gasket retainer.

19. The method of claim 18, wherein after positioning the sealing member on the outer surface of the retainer loop sidewall, a first portion of the sealing member is in contact with the gasket retainer, and a second portion of the sealing member is in contact with the outer surface of the retainer loop sidewall, such that the sealing member exerts a force on each of the gasket retainer and the retainer loop, the force causing the retainer arm ledge to contact the gasket retainer ledge such that the sealing member is secured between the gasket retainer and the retainer loop.

20. The method of claim 19, wherein the retainer loop is immovable relative to the gasket retainer when the sealing member is positioned between the retainer loop and the gasket retainer.

\* \* \* \* \*